US008128034B2

(12) United States Patent
Karem

(10) Patent No.: US 8,128,034 B2
(45) Date of Patent: Mar. 6, 2012

(54) ROTORCRAFT WITH OPPOSING ROLL MAST MOMENTS, AND RELATED METHODS

(76) Inventor: Abe Karem, Tustin, CA (US)

(*) Notice: Subject to any disclaimer, the term of this patent is extended or adjusted under 35 U.S.C. 154(b) by 1331 days.

(21) Appl. No.: 11/505,066

(22) Filed: Aug. 15, 2006

(65) Prior Publication Data
US 2010/0270422 A1    Oct. 28, 2010

Related U.S. Application Data

(60) Provisional application No. 60/708,645, filed on Aug. 15, 2005.

(51) Int. Cl.
*B64C 13/18*    (2006.01)
*B64C 27/08*    (2006.01)
(52) U.S. Cl. ..................... 244/175; 244/17.23

(58) Field of Classification Search ............... 244/17.11, 244/175, 17.23
See application file for complete search history.

(56) References Cited

U.S. PATENT DOCUMENTS 1,783,011 A * 11/1930 Florine .................. 416/115
(Continued)

*Primary Examiner* — Tien Dinh
(74) *Attorney, Agent, or Firm* — Fish & Associates, PC

(57) ABSTRACT

In rotorcraft having rotors on multiple masts, a controller causes opposing roll mast moments to be applied to the different rotors. In preferred embodiments, the opposing roll moment is the result of increasing the lift on the advancing blade and reducing the lift on the retreating blade on the second rotor. This can be accomplished in any suitable manner, such as by applying differential cyclic roll control to the two rotors by tilting the two Swashplates of the two rotors or by using Individual Blade Control (IBC).

12 Claims, 9 Drawing Sheets

U.S. PATENT DOCUMENTS

| | | | |
|---|---|---|---|
| 2,629,568 A * | 2/1953 | Wood et al. | 244/17.23 |
| 2,860,711 A | 11/1958 | Dancik | |
| 3,938,762 A * | 2/1976 | Murphy | 244/17.13 |
| 4,008,979 A * | 2/1977 | Cooper et al. | 416/40 |
| 4,856,732 A | 8/1989 | Eickmann | |
| 5,046,684 A * | 9/1991 | Wolkovitch | 244/7 A |
| 5,214,596 A * | 5/1993 | Muller | 702/144 |
| 6,641,365 B2 | 11/2003 | Karem | |
| 7,264,199 B2 * | 9/2007 | Zientek | 244/17.11 |
| 2005/0236518 A1 | 10/2005 | Scott | |
| 2009/0256026 A1 * | 10/2009 | Karem et al. | 244/99.2 |

* cited by examiner

ROTORCRAFT WITH OPPOSING ROLL MAST MOMENTS, AND RELATED METHODS

This application claims priority to U.S. Provisional Application Ser. No. 60/708,645 filed Aug. 15, 2005.

FIELD OF THE INVENTION

The field of the invention is rotorcraft having multiple rotors.

BACKGROUND OF THE INVENTION

In hover, each of the rotating blades of known rotorcraft rotors have the same airspeed, angle of attack and lift coefficient. Obviously, in forward flight, the blade rotating in the direction of the flight (advancing blade) will have its effective airspeed increased by the forward motion of the rotorcraft, i.e. effective velocity is equal to angular velocity plus vehicle velocity. Similarly, the blade rotating opposed to the direction of the flight (retreating blade) has its effective airspeed reduced by the vehicle velocity. (see FIG. 1).

Rotors generally comprise aerodynamically shaped blades attached to a rotating mast at the center of rotation. In some rotors (teetering rotors) the blades are attached to hub which is free to teeter one blade up, opposing blade down. In other rotors (articulated rotors) the hub is rigidly attached to the rotating mast and the blades are attached to the hub, at a point outboard of the center of rotation, by an articulated attachment allowing the blades flap up and down. In other rotors (semi-rigid rotors) the blades are attached to the rotating mast through a flexible hub which allows the blades to flap up or down proportionally to up or down moment applied by the blade on the hub. The blades of rigid rotors are rigidly attached to the hub and the rotating mast in the up-down flap direction. Semi-rigid and rigid rotors are also known as hingeless and bearingless rotors in the rotorcraft community The moments applied by the blades and hub on the rotating mast are called mast moments. These moments are transferred to the rotorcraft airframe. The mast moment in the plane of rotation is the rotor driving torque, the mast moments out of the rotor plane of rotation are used for controlling the rotorcraft in roll and in pitch.

Teetering rotors, due to their teetering hinge, cannot apply out-of-plane mast moments to the airframe. Roll and pitch maneuvers of rotorcraft equipped with teetering rotors rely on tilting the plane of the rotor by using differential control of the blades' angle of attack (cyclic control). This causes the lift vector to tilt in the desired roll and pitch direction, resulting in the rotorcraft frame following the rotor maneuver lift vector, without mast moment having been applied.

Articulated rotors can apply out-of-plane mast moments proportional to the radial distance from the blade flapping hinge to the center of rotation. The trend in the development of such rotors was to increase such radial distance to enhance the roll and pitch maneuver response of rotorcraft equipped with such rotors.

Semi-rigid and rigid rotors apply out-of-plane mast moments proportional to the stiffness of their hub and blades in the up-down flap direction.

In co-axial rotor rotorcraft two rotors turn in opposing direction on the same mast. When such rotorcraft have rigid co-axial rotors, it is known to apply higher lift on the advancing blade of each rotor so that the mast moments on the two rotors cancel each other out. It is also known in such cases to increase the canceling mast moments as a function of advance ratio (the ratio of rotorcraft forward speed to the speed of the tip of the rotor due to rotational velocity). Such is the case in Sikorsky Aircraft's™ Advancing Blade Concept ("ABC"). Interestingly, however, beneficial application of opposing mast moments was never applied to rotor configurations with independent masts such as tandem rotors, side-by-side rotors, and tilt rotors.

The control mechanism of the prior art rotorcraft reduces the lift on advancing blade in forward flight to achieve zero roll mast moment. This is necessary in single rotor rotorcraft to avoid rolling the vehicle and in teetering rotors which are free to teeter (advancing blade up, retreating blade down). This zero mast moment approach results in the advancing blade having a lower lift coefficient and the retreating blade higher lift coefficient. At normal cruising speed, retreating blades of current rotorcraft (tilt-rotor aircraft in airplane mode excepted) are stalled from the center of rotation to a certain radius from the center due to the increase in local blade angle of attack beyond the stall angle of attack. This stall causes the rotor to have a decreasing total lift limit as the forward speed increases (FIG. 2). Furthermore, the stall of the retreating blade causes substantial rotor loads and rotorcraft vibration. Discussion of recent embodiments is contained in US 2005/0236518 to Scott (publ. Oct. 2005), the disclosure of which, along with any other extraneous materials referenced in the present application, is incorporated herein.

All current rotorcraft equipped with multiple lifting rotors (for example tandem rotor helicopters and tilt-rotor aircraft) have their rotors turn in opposing senses of rotation. But, the successful introduction of rotorcraft with a lifting rotor on each of multiple masts (tandem rotors, side-by-side rotors and twin tilt-rotors), and the introduction of rotors capable of out-of-plane mast moments (articulated, semi-rigid and rigid rotors), did not cause the rotorcraft industry to change from equalizing the lift of the advancing and retreating blades (some obvious use in unsuccessful coaxial rigid rotors excepted). Thus, there is still a need to apply opposing mast moments to rotors on independent masts such as tandem rotor, side-by-side, and tilt rotors.

SUMMARY OF THE INVENTION

The inventive subject matter provides apparatus and methods in which roll mast moment on one rotor is applied such that the lift on its advancing blade is increased and the lift on its retreating blade is decreased. Roll moment applied to the rotorcraft airframe is countered by an equal and opposing roll moment by the second rotor. In preferred embodiments, the opposing roll moment is the result of increasing the lift on the advancing blade and reducing the lift on the retreating blade on the second rotor. This can be accomplished in any suitable manner, such as by applying differential cyclic roll control to the two rotors by tilting the two Swashplates of the two rotors or by using Individual Blade Control (IBC), wherein the pitch of each blade about its feather axis is controlled individually.

Among other things it is contemplated that embodiments of the inventive subject matter will increase the total lift, reduce the rotor loads, and reduce the vibration level of rotorcraft equipped with more than one lift producing rotor while in forward flight. The increase in total rotorcraft lift is achieved by utilizing the higher lift available on the advancing blades. Such an increase is a function of the roll mast moment applied (FIG. 4). The roll mast moment is limited by the mast moment capability of the particular rotor, and by the structural strength of the connecting devices between one rotor and another such as fixed and rotating masts, gearboxes, attachments and airframe.

The reduction of the angle of attack and lift of the retreating blade reduces the stalled area of this blade and as a result reduces the blade and rotor oscillatory loads and the rotorcraft vibration level. These in turn result in higher rotor gearbox and airframe reliability, as well as longer life, lower rotorcraft crew fatigue, and improved acceptance of the rotorcraft by passengers. Of course, the specific advantages will depend on the specifics of any given aircraft. For example, while the overall vibratory loads transferred to the airframe decrease, vibratory loads at specific frequencies and specific directions may increase, the N/revolution (where N is the number of blades) vertical hub shearing force will increase with the proposed method of control. The proposed scheme will also result in a net reduction of cyclic applied to the rotors, potentially resulting in more mechanical control authority. Instead of applying increasingly large amounts of cyclic to the rotor to balance the dissymmetric lift arising with increasing airspeed, the rotor is allowed to carry some moment, reducing the required cyclic input.

Various objects, features, aspects and advantages of the inventive subject matter will become more apparent from the following detailed description of preferred embodiments of the invention, along with the accompanying drawings in which like numerals represent like components.

DETAILED DESCRIPTION

Figure 1:
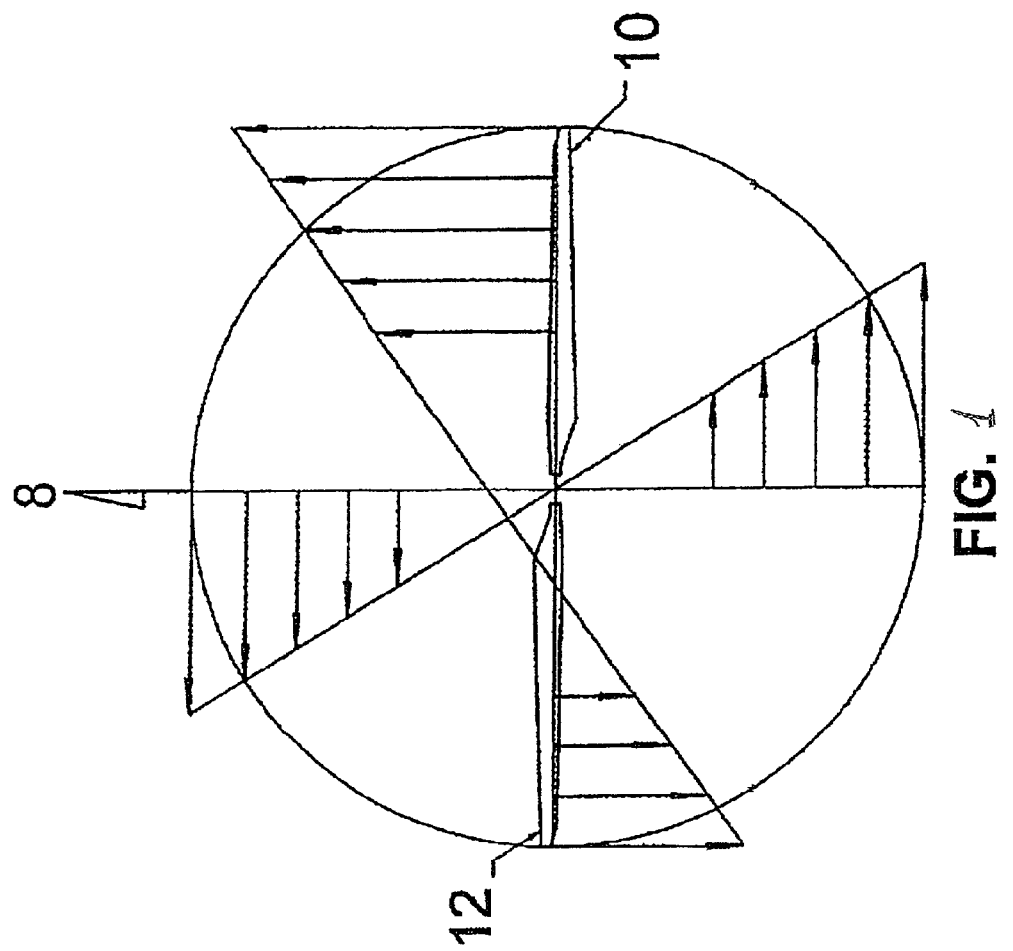
FIG. 1 is a plan view of a prior art rotor showing the effect of forward flight on blade velocity distribution.
Figure 2:
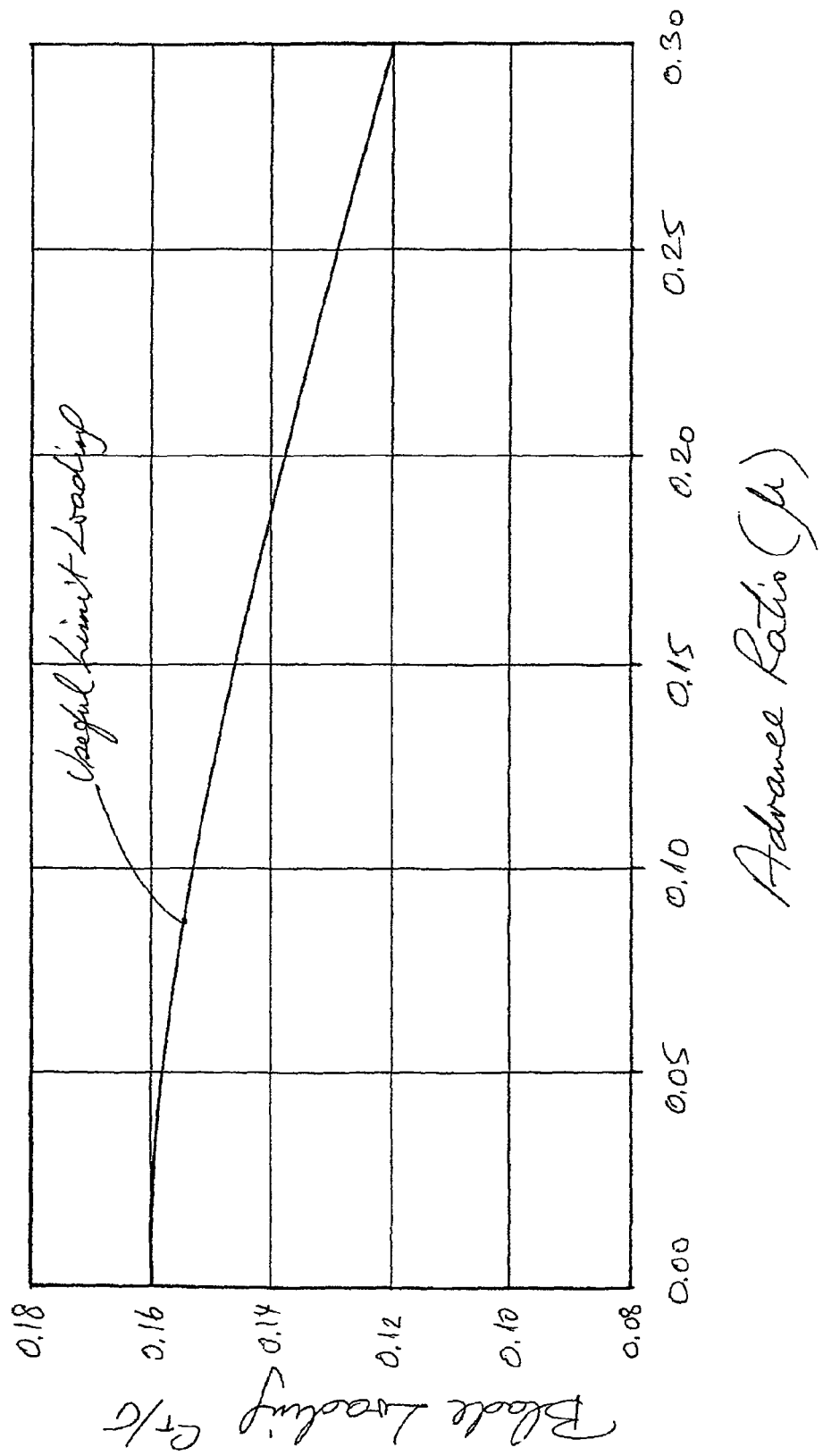
FIG. 2 is a chart showing the reduction in total rotor lift as expressed in Blade Loading (CT/S) as function of forward flight as expressed in Advance Ratio (Mu).
Figure 3:
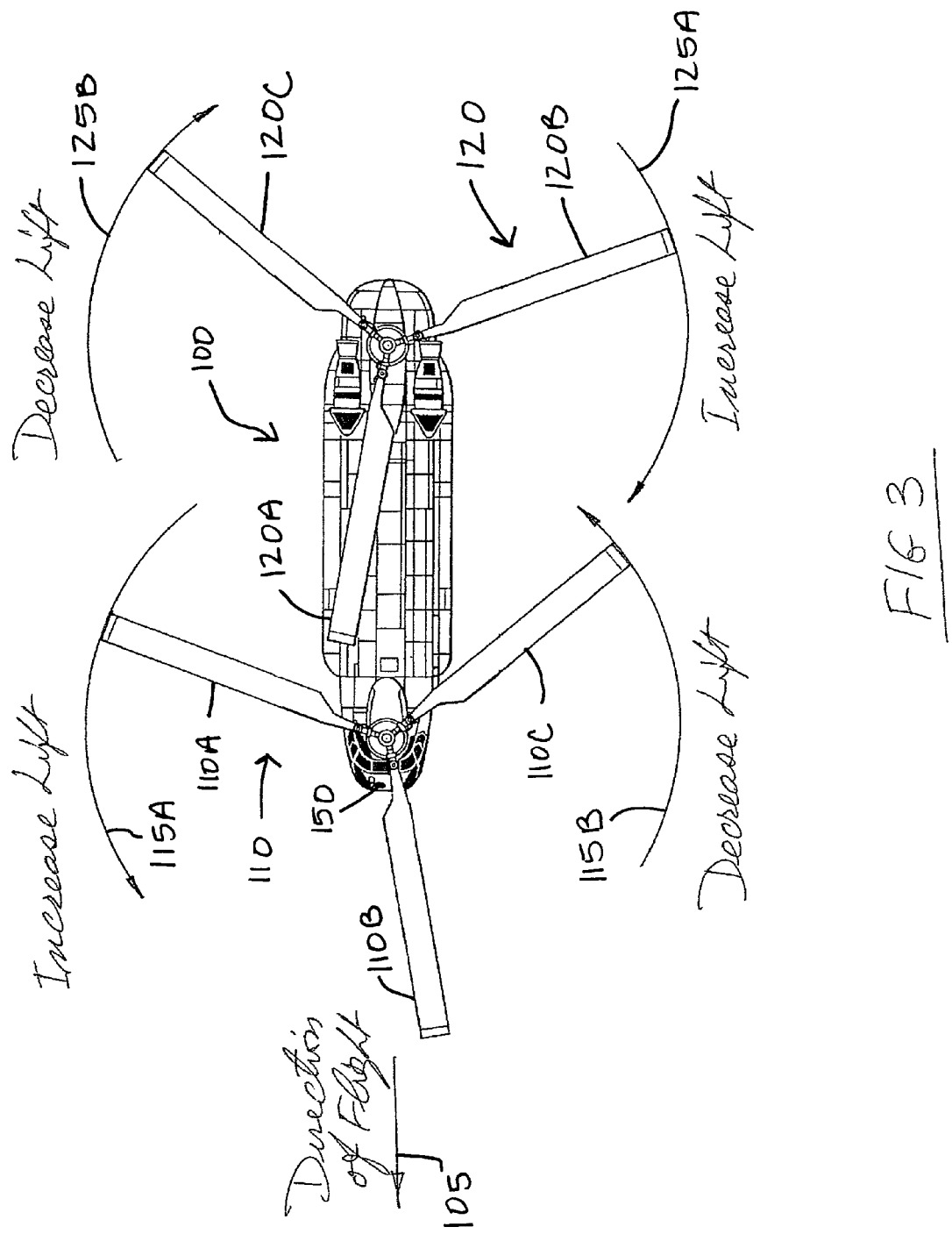
FIG. 3 is a top view of a twin tandem-rotor rotorcraft showing an application of the inventive subject matter.

In FIG. 3, a twin tandem-rotor rotorcraft 100 is capable of moving in a forward direction of flight 105 using forward rotor 110 and aft rotor 120. Forward rotor 110 includes blades 110A, 110B, and 110C, and rotates in a counterclockwise direction. Aft rotor 120 includes blades 120A, 120B, and 120C, and rotates in a clockwise direction.

In a manner similar to that known for rotorcraft having rigid or semi-rigid co-axial rotors, a control mechanism 150 applies higher lift on the advancing blade of each rotor so that the mast moments on the two rotors substantially (i.e. except for the desired control rolling moment) cancel each other out.

In this particular example, at the instant of the drawing, increased lift would be applied to blade 110A of rotor 110, and 120B of rotor 120. Of course, the situation changes as blades rotate to different positions, but in general it can be said that relatively increased lift is applied to blades of rotor 110 when positioned in the direction of arrow 115A, and to blades of rotor 120 when positioned in the direction of arrow 125A. Similarly, relatively decreased lift is applied to blades of rotor 110 when positioned in the direction of arrow 115B, and to blades of rotor 120 when positioned in the direction of arrow 125B.

Figure 4:
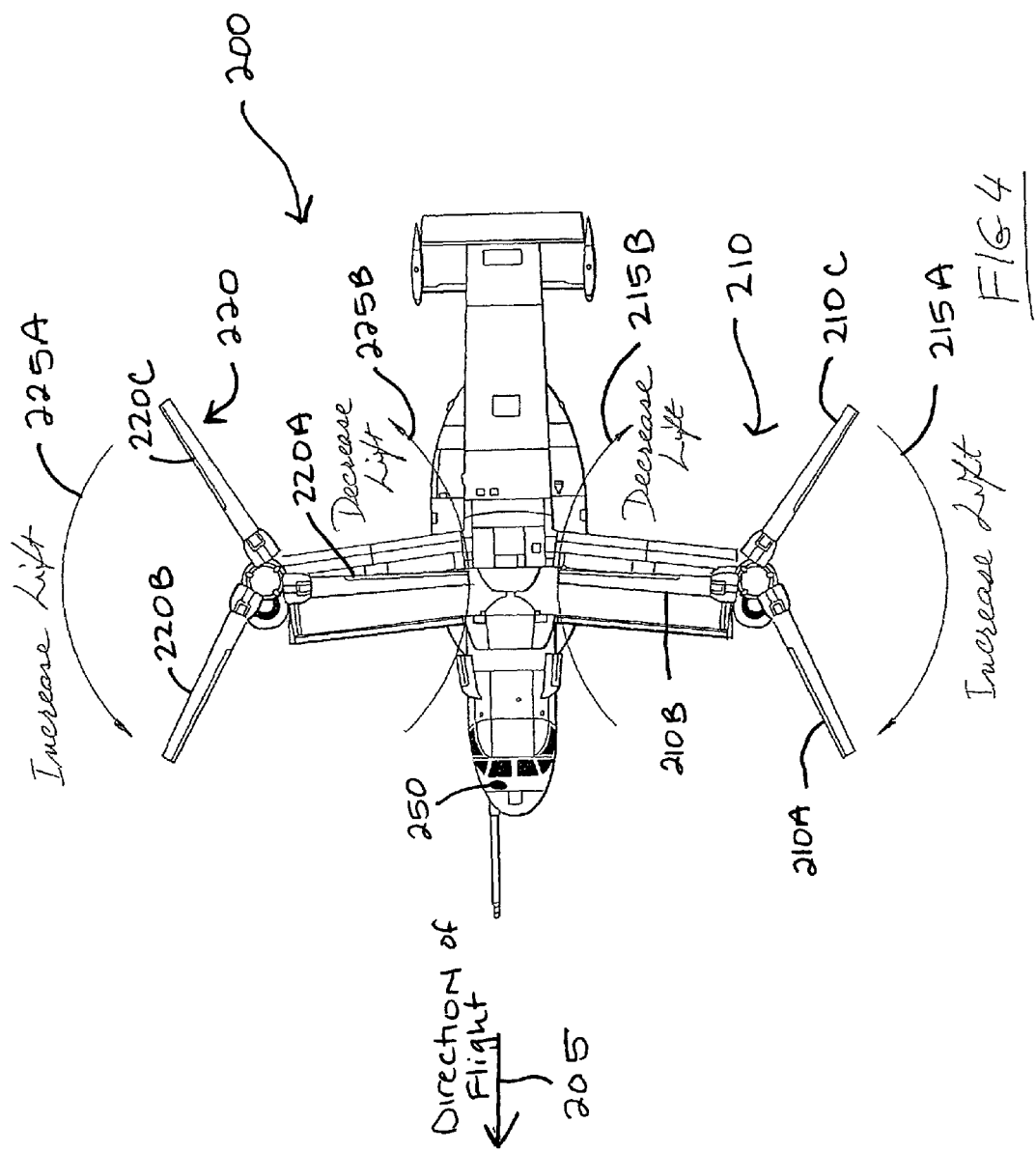
FIG. 4 is a top view of a twin tilt-rotor rotorcraft showing the application of the inventive subject matter.

In FIG. 4 a twin tilt-rotor rotorcraft 200 is capable of moving in a forward direction of flight 205 using left rotor 210 and right rotor 220. Left rotor 210 includes blades 210A, 210B, and 210C, and rotates in a clockwise direction. Right rotor 220 includes blades 220A, 220B, and 220C, and rotates in a counterclockwise direction.

Here, a control mechanism 250 applies higher lift on the advancing blade of each rotor so that the mast moments on the two rotors substantially cancel each other out. In this particular example, at the instant of the drawing, increased lift would be applied to blades 210A and 210C of rotor 210, and 220B and 220C of rotor 220. Relatively increased lift is therefore applied to blades of rotor 210 when positioned in the direction of arrow 215A, and to blades of rotor 220 when positioned in the direction of arrow 225A. Similarly, relatively decreased lift is applied to blades of rotor 210 when positioned in the direction of arrow 215B, and to blades of rotor 220 when positioned in the direction of arrow 225B.

Figure 8:
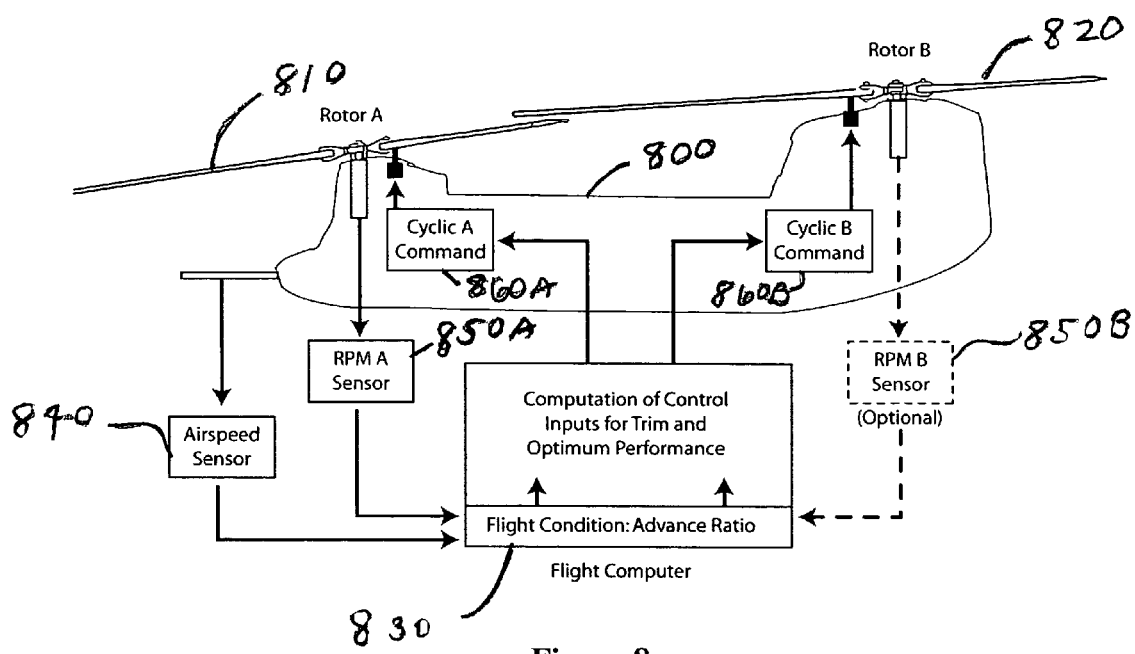
FIG. 8 is a diagram of a preferred implementation of the automated increase in cyclic control of the two rotors as function of rotorcraft advance ratio.

Of course; the control mechanisms 150, 250 can exert their respective controls over the mast moments using any suitable electronic or other mechanism as for example the one described in FIG. 8. As noted above, this can be accomplished in any suitable manner, such as by applying differential cyclic roll control to the two rotors by tilting the two Swashplates of the two rotors, or by using Individual Blade Control (IBC) or other at least partially electronic control.

Although all of the figures are intended to be drawn approximately to scale for given embodiments, it should be appreciated that the figures are emblematic of all realistic embodiments of the inventive concepts. Thus, for example, the fuselage shapes, rotor diameters and so forth can be other than that explicitly shown. To site a trivial example, FIG. 4 should be considered emblematic of a related embodiment in which the blades are mounted facing in the opposite directions from that expressly shown, the 210 rotor turns counterclockwise, and the 220 rotor turns clockwise. Similarly, it should be appreciated that the blades can be of any practical length, thickness, materials, and so forth, can be articulated, semi-rigid, or rigid, and the fuselage can be of any practical size, type, materials, etc.

It should now be appreciated that an important concept herein is that non-coaxial rotors can take advantage of opposing mast moments in a manner analogous to that used for co-axial rotors. By increasing the lift load on the advancing blades and reducing the lift load on the retreating blade, the application of opposing roll mast moments on multiple rotors in rotorcraft forward flight (tilt-rotors being in helicopter or conversion modes) provides the following benefits:

Increase in maximum available rotor lift (higher carried weight and/or higher altitude and maneuverability);

Reduction in rotor power required to sustain a given lift (increased power efficiency, reduced fuel consumption, longer rotorcraft range and longer engine and transmission lives);

Reduction in rotor loads (lighter rotor structure and/or longer fatigue life of the rotor blades, hub and control hardware); and Reduction in rotorcraft vibration level.

Figure 5:
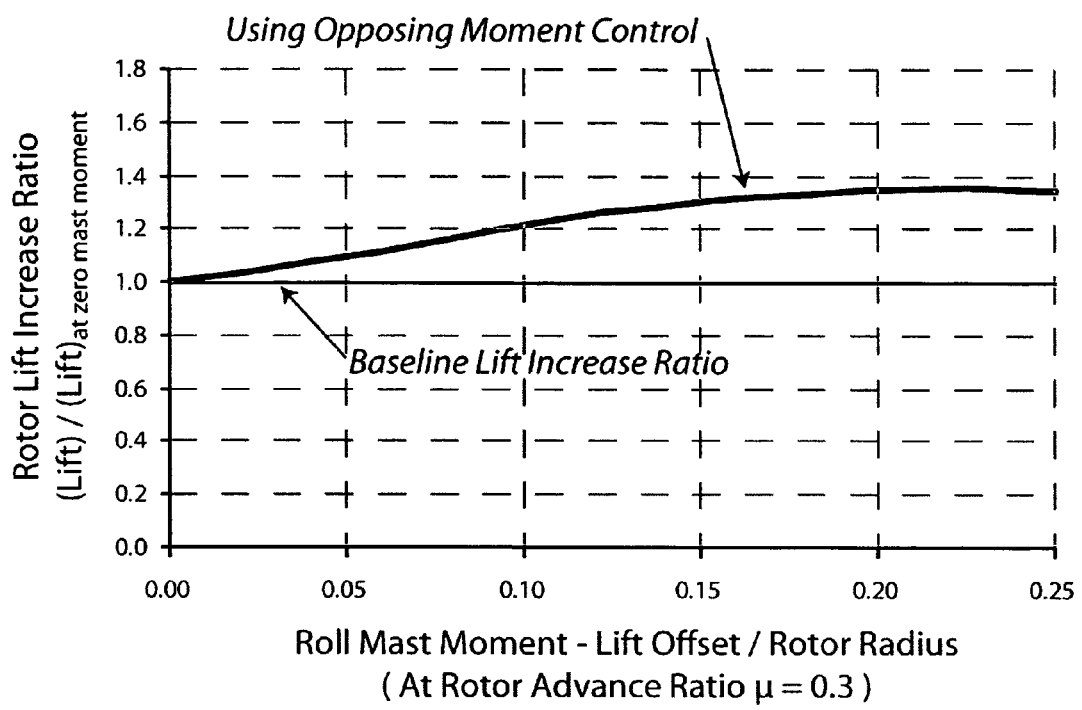
FIG. 5 is a chart of the increase in total rotorcraft lift of the inventive subject matter, as applied to a twin-rotor helicopter at rotor advance ratio of 0.3, as a function of applied mast moment.
Figure 6:
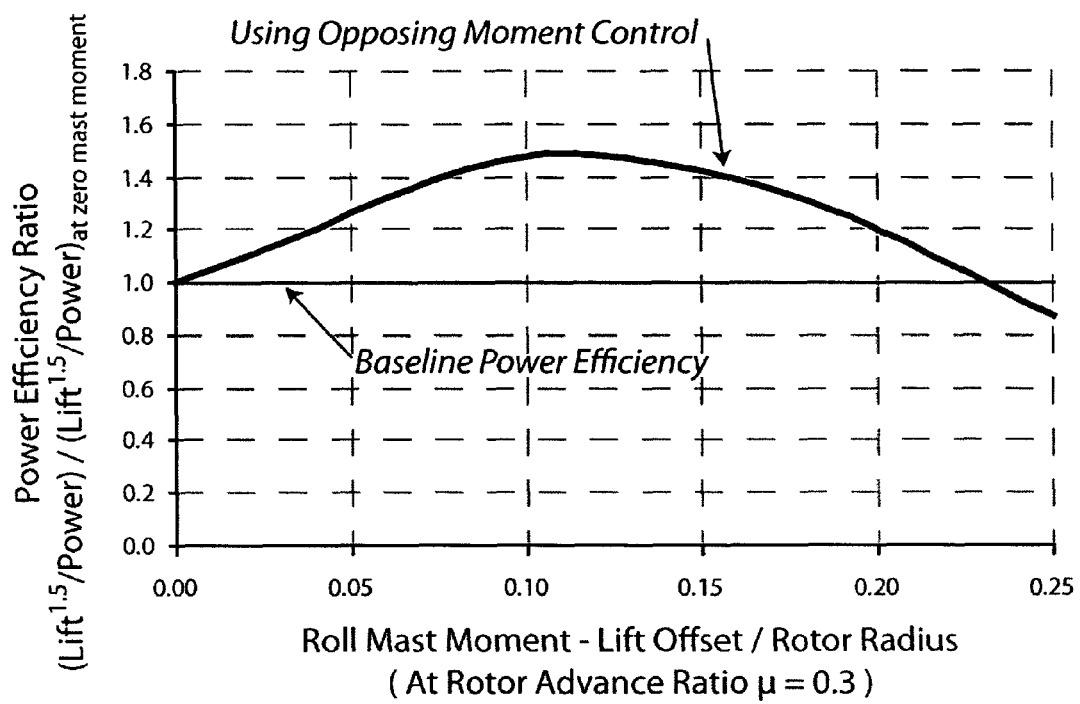
FIG. 6 is a chart of the increase in rotor power efficiency (expressed in ratio of rotor lift$^{1.5}$/required power) of the inventive subject matter, as applied to a twin-rotor helicopter at rotor advance ratio of 0.3, as a function of applied mast moment.

FIG. 5 and FIG. 6 present analytical results modeling of a twin-rotor helicopter with rigid rotors at advance ratio of 0.3. The analysis used Wayne Johnson's CAMRAD II, and was based on detail design of the analyzed rotor. In the analyzed case, the selection of the level of mast moment at advance ratio of 0.3 was aimed at high power efficiency and a lift offset of 0.106 of rotor radius was selected. This selection provided a combination of 22.6% increase in rotor lift and a 48.7% increase in power efficiency (lift$^{1.5}$/required power). In cases where the rotor structure is capable of sustaining higher mast moment and maximum lift at advance ratio of 0.3 is more important than power efficiency, it is shown that increasing lift offset will increase the rotor lift ratio, but power efficiency does not continue to increase.

While the above example is computed for an advance ratio of 0.3, helicopters often fly to forward speeds where advance ratio is 0.4 or beyond. It is well understood that the above mentioned benefits of the inventive subject matter are a function of advance ratio for a given mast moment. As currently understood, the inventive subject matter provides little or no advantages in hover flight; its advantages increase with increasing advance ratio (higher forward speed).

Figure 7:
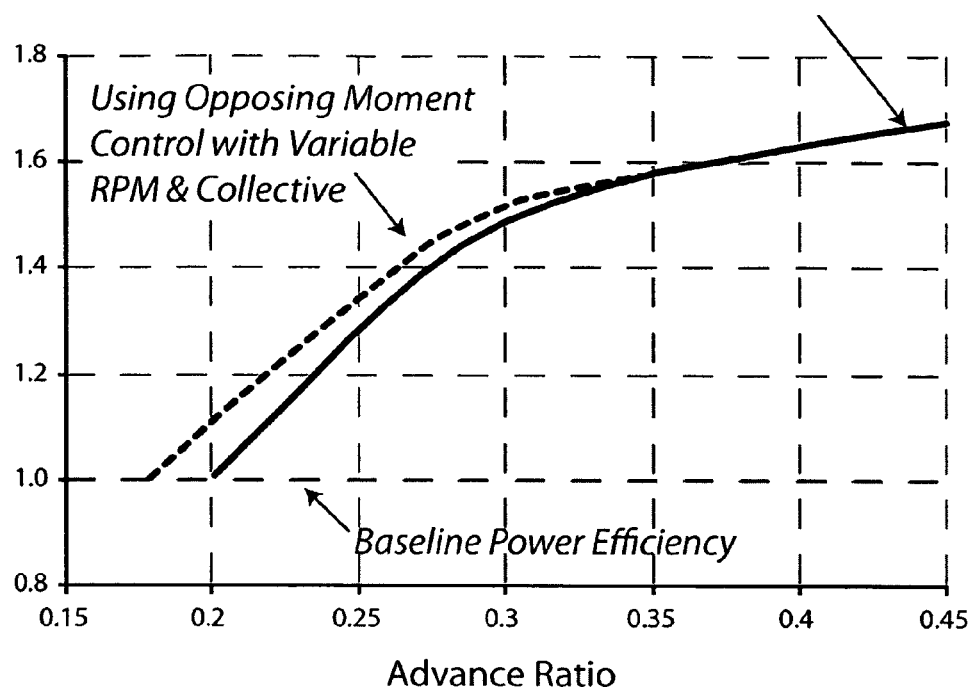
FIG. 7 is a chart of a preferred mast moment and the increase in rotor power efficiency of the inventive subject matter, as applied to a twin-rotor helicopter as a function of advance ratio.

FIG. 7 presents analytical results demonstrating this increase of power efficiency with advance ratio.

In FIG. 8, a rotorcraft 800 generally has two rotors, Rotor A 810 and rotor B 820, a flight computer 830. The flight computer 830 receives data from airspeed sensor 840, RPM sensor 850A and optionally 850B, and provides output to control the rotors using Cyclic A Command 860A and Cyclic B Command 860B, all in accordance with disclosures herein.

Thus, it is specifically contemplated to design, manufacture, implement, fit, retrofit, or in some other manner provide a rotorcraft having multiple lifting rotors on multiple masts with a controller that commands opposing roll mast moments on the multiple masts as a function of the rotorcraft's forward speed during edgewise flight. The controller can command the opposing roll mast moments using any suitable function, but preferably does so as a function of advance ratio, with application greater opposing roll mast moments with higher advance ratio. The function can be linear, but is preferably non-linear as shown in FIGS. 5 and 6. The control can be exerted in a fully automatic fashion, or under at least partially manual control, and can utilize a swashplate, individual blade control (IBC), or any other suitable system. The multiple masts can be in a tandem, a side-by-side, tilt rotor or other suitable configuration.

Figure 9:
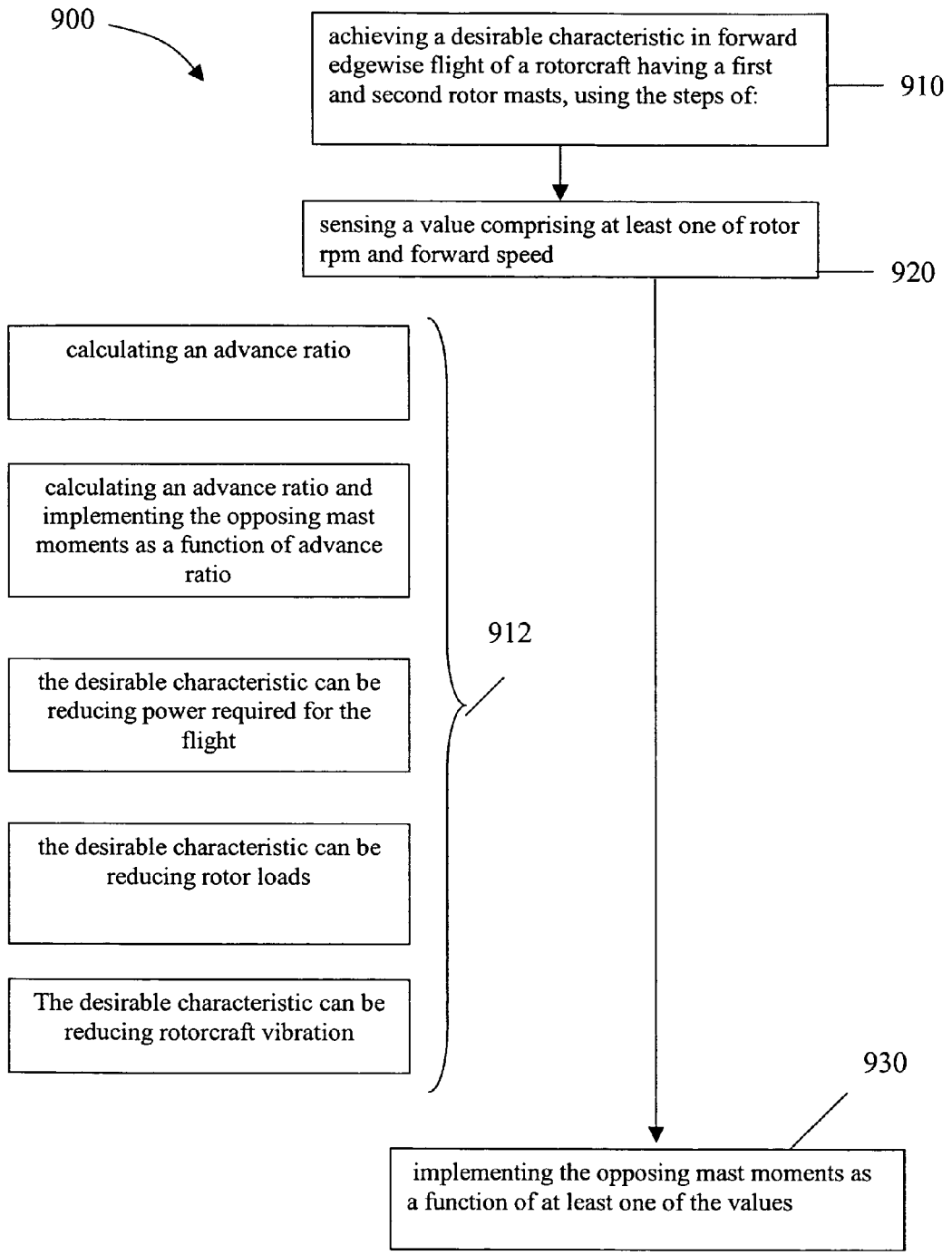
FIG. 9 is a diagram of steps in a class of preferred methods.

As depicted in FIG. 9, contemplated methods 900 include achieving a desirable characteristic in forward edgewise flight of a rotorcraft having a first and second rotor masts 910, using the steps of: sensing a value comprising at least one of rotor rpm and forward speed 920; and implementing the opposing mast moments as a function of at least one of the values 930. Under such methods, one can advantageously implement one or more optional steps, collectively designated 912, including: calculating an advance ratio, and implementing the opposing mast moments as a function of advance ratio, and using as the desirable characteristic any one or more of reducing power required for the flight, reducing rotor loads, reducing rotorcraft vibration. Of course, FIG. 9 reflects only some of the myriad possible methods consistent with the inventive concepts. For example, while FIG. 9 shows an "open-loop" implementation, alternate embodiments are possible. Among other things, it would be possible using airspeed, mast-moment, torque, and rpm sensors to have the flight computer determine the optimal cyclic input for minimum power while staying within measured structural load limits on the mast and other components.

Thus, specific embodiments, applications, and methods have been disclosed in which rotorcraft have rotors on multiple masts, with opposing roll mast moments. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A rotorcraft, comprising:
   first and second hingeless rotors on first and second masts; and a controller that:
   determines desired roll mast moments out of the rotor plane of rotation as a function of the rotorcraft's forward speed during edgewise flight and
   commands a first roll mast moment on a first rotors out of the rotor plane of rotation using cyclic rotor pitch control; and
   commands a second roll mast moment out of the rotor plane of rotation on a second rotor using cyclic rotor pitch control, such that the second mast moment opposes the first mast moment in direction and magnitude.

2. The rotorcraft of claim 1, wherein the controller determines desired roll mast moments out of the rotor plane of rotation as a function of rotor rpm.

3. The rotorcraft of claim 1, wherein the controller determines desired roll mast moments out of the rotor plane of rotation as a function of rotor advance ratio.

4. The rotorcraft of claim 1, wherein the controller commands the opposing first roll mast moment and second roll mast moments in a fully automatic fashion.

5. The rotorcraft of claim 1, wherein the controller commands the opposing first roll mast moment and second roll mast moment under at least partially manual control.

6. The rotorcraft of claim 1, wherein the controller is non-linear.

7. The rotorcraft of claim 4, wherein the controller is at least partially electronic.

8. The rotorcraft of claim 1, wherein the controller commands opposing roll mast moments on the multiple masts using a swashplate.

9. The rotorcraft of claim 1, wherein the controller commands opposing roll mast moments on the multiple masts using individual blade control (IBC).

10. The rotorcraft of claim 1, wherein the multiple masts are in a tandem configuration.

11. The rotorcraft of claim 1, wherein the multiple masts are in a side-by-side configuration.

12. The rotorcraft of claim 1, wherein the multiple masts are in a tilt rotor configuration.

* * * * *